(12) United States Patent
Kadohara

(10) Patent No.: US 7,742,086 B2
(45) Date of Patent: Jun. 22, 2010

(54) IMAGE PROCESSING APPARATUS AND IMAGE PROCESSING METHOD

(75) Inventor: Terutake Kadohara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1070 days.

(21) Appl. No.: 11/152,416

(22) Filed: Jun. 14, 2005

(65) Prior Publication Data

US 2005/0280722 A1   Dec. 22, 2005

(30) Foreign Application Priority Data

Jun. 22, 2004  (JP)  ............................. 2004-183668

(51) Int. Cl.
H04N 9/64  (2006.01)
(52) U.S. Cl. ..................................... 348/247
(58) Field of Classification Search .................. 348/246, 348/247
See application file for complete search history.

(56) References Cited

U.S. PATENT DOCUMENTS 7,092,018 B1 * 8/2006 Watanabe .................... 348/247
7,365,783 B2 * 4/2008 Hashimoto et al. ........... 348/246
2002/0005904 A1 * 1/2002 Mendis ....................... 348/246

FOREIGN PATENT DOCUMENTS

| JP | 2000-059689 A | 2/2000 |
|---|---|---|
| JP | 2000-059690 A | 2/2000 |
| JP | 2000-209506 A | 7/2000 |
| JP | 2003-259221 A | 9/2003 |
| JP | 2004-172973 A | 6/2004 |

* cited by examiner

Primary Examiner—David L Ometz
Assistant Examiner—Dillon Durnford-Geszvain
(74) Attorney, Agent, or Firm—Canon U.S.A., Inc., IP Division

(57) ABSTRACT

There is provided an image processing apparatus including a first storage unit for storing a first correction data for correcting a defective pixel signal outputted from a defective pixel of an image sensor, a detecting unit for detecting a defective pixel signal outputted from a defective pixel of the image sensor in accordance with a designation set by a user, a creating unit for creating a second correction data based on the defective pixel signal detected by the detecting unit, a determination unit for determining whether the second correction data is used with the first correction data, in accordance with a designation set by a user; and a correction unit for correcting a pixel signal output from the image sensor in accordance with a determination result of the determination unit.

2 Claims, 8 Drawing Sheets

FIG. 3A

| C-1 | STANDARD CONDITION | ADDITIONAL CONDITION 1 | ADDITIONAL CONDITION 2 |
|---|---|---|---|
| (1) STORAGE TIME | 1 SEC. | 30 SEC. | ARBITRARY |
| (2) OPERATING TEMPERATURE | ROOM TEMPERATURE | ROOM TEMPERATURE | ARBITRARY |
| (3) USAGE ENVIRONMENT | PRODUCTION PROCESS | PRODUCTION PROCESS | USER |
| (4) USAGE TYPE | IMAGE SENSOR | IMAGE SENSOR | IMAGING APPARATUS |
| (5) OPERATING CONDITION | NORMAL | NORMAL | ARBITRARY |

FIG. 3B

| C-2 | STANDARD CONDITION | ADDITIONAL CONDITION 1 | ADDITIONAL CONDITION 2 |
|---|---|---|---|
| (1) STORAGE TIME | 1 SEC. | 30 SEC. | ARBITRARY |
| (2) OPERATING TEMPERATURE | ROOM TEMPERATURE | 45°C | ARBITRARY |
| (3) USAGE ENVIRONMENT | PRODUCTION PROCESS | PRODUCTION PROCESS | USER |
| (4) USAGE TYPE | IMAGE SENSOR | IMAGE SENSOR | IMAGING APPARATUS |
| (5) OPERATING CONDITION | NORMAL | NORMAL | ARBITRARY |

FIG. 3C

| C-3 | STANDARD CONDITION | ADDITIONAL CONDITION 1 | ADDITIONAL CONDITION 2 |
|---|---|---|---|
| (1) STORAGE TIME | 1 SEC. | 30 SEC. | ARBITRARY |
| (2) OPERATING TEMPERATURE | 45°C | ROOM TEMPERATURE | ARBITRARY |
| (3) USAGE ENVIRONMENT | PRODUCTION PROCESS | PRODUCTION PROCESS | USER |
| (4) USAGE TYPE | IMAGE SENSOR | IMAGING APPARATUS | IMAGING APPARATUS |
| (5) OPERATING CONDITION | NORMAL | NC | ARBITRARY |

FIG. 3D

| C-4 | STANDARD CONDITION | ADDITIONAL CONDITION 1 | ADDITIONAL CONDITION 2 |
|---|---|---|---|
| (1) STORAGE TIME | 1 SEC. | 30 SEC. | ARBITRARY |
| (2) OPERATING TEMPERATURE | 45°C | 45°C | ARBITRARY |
| (3) USAGE ENVIRONMENT | PRODUCTION PROCESS | PRODUCTION PROCESS | USER |
| (4) USAGE TYPE | IMAGE SENSOR | IMAGE SENSOR | IMAGING APPARATUS |
| (5) OPERATING CONDITION | NORMAL | NORMAL | ARBITRARY |

FIG. 5A

EXTRACTION FLAW
LEVEL SETTING xxxx  (1~4095)

MORE THAN THE ABOVE VALUE
IS DETERMINED TO BE A FLAW

FIG. 5B

EXTRACTION FLAW
LEVEL SETTING xxxx (1~4095)

0    XXXX            4095

IMAGE PROCESSING APPARATUS AND IMAGE PROCESSING METHOD

BACKGROUND OF THE INVENTION

1. Field of the Invention

The present invention relates to a correcting process of an image picked-up by an image sensor, and in particular, relates to an extracting and correcting process of point defects generated by a defective pixel or a abnormality of dark current characteristics of an image sensor.

2. Description of the Related Art

In recent years, there have been concerns about the increase in a defective pixel which outputs a defective pixel signal called a point defect as a result of an increase in the pixel number of an image sensor used by a digital camera. The point defect is generated according to leak by a structural failure of the pixel and a abnormality of dark current characteristics. There is a point defect which is generated regardless of an exposure time or a sensitivity setup and a point defect to which the necessity for correction comes out according to a shooting condition.

The following method is proposed as a correction process for data of the point defect. For example, in Japanese Patent Laid-Open No. 2000-209506, black level data picked-up by the same exposure time as the exposure time at the time of a usual shooting is obtained, and the pixel which exceeds a predetermined level in the black level data is determined to be a point defect pixel. The position of the determined point defect pixel is stored, and data of the stored point defect pixel is corrected at the time of the usual shooting.

Also, in Japanese Patent Laid-Open No. 2000-59690, the data of the defective pixel is corrected based on position information of the defective pixel beforehand stored for a shooting image of a short exposure time. The defective pixel is detected for the shooting image of the long exposure time, and the data of the defective pixel is corrected based on the detection result.

However, with respect to the correction number of the point defect, there is a limit by restrictions of a cost and a system by a memory capacity, a correction time, etc. Since the generation state of the point defect changes according to a shooting condition, suitable correction of the point defect cannot be performed. Additionally, in a defect detection process of a usual production process, it is impossible to set up all the generation states for obtaining the correction data because of a process time, a restriction of memory capacity, etc. For the above reason, in cases where a user used an imaging apparatus in environments other than the presumed general operating environment, it is difficult to efficiently correct the point defect generated in the user's operating environment.

SUMMARY OF THE INVENTION

In view of the above problem in the conventional art, the present invention provides an image processing apparatus and an image processing method which can obtain a high quality image with the point defect efficiently corrected in any shooting condition and operating environment (e.g., an exposure time, a temperature, a circumference brightness, etc.).

In accordance with an aspect of the present invention, an image processing apparatus includes: a first storage unit arranged to store a first correction data for correcting a defective pixel signal outputted from a defective pixel of an image sensor; a detecting unit arranged to detect a defective pixel signal outputted from a defective pixel of the image sensor in accordance with a designation set by a user; a creating unit arranged to create a second correction data based on the defective pixel signal detected by the detecting unit; a determination unit, arranged to determine whether the second correction data is used with the first correction data, in accordance with a designation set by a user; and a correction unit, arranged to correct a pixel signal output from the image sensor in accordance with a determination result of the determination unit.

In accordance with another aspect of the present invention, an image processing method includes: detecting a defective pixel signal outputted from a defective pixel of an image sensor in accordance with a designation set by a user; creating a first correction data based on the detected defective pixel signal; determining whether the first correction data is used with a second correction data, in accordance with a designation set by a user, wherein the second correction data for correcting a defective pixel signal outputted from a defective pixel of the image sensor is pre-stored in a storage unit; and correcting a pixel signal output from the image sensor in accordance with the determination result.

Further features and advantages of the present invention will become apparent from the following description of exemplary embodiments with reference to the attached drawings.

BRIEF DESCRIPTION OF THE DRAWINGS

FIGS. 3A, 3B, 3C and 3D illustrate an acquiring condition of a correction data in the present invention.

FIGS. 5A and 5B illustrates an extraction defect level setting screen.

DESCRIPTION OF THE EMBODIMENTS

Preferred embodiments of the present invention will be described in detail in accordance with the accompanying drawings. However, the dimensions, materials, shapes and relative positions of the constituent parts shown in the embodiments should be changed as convenient depending on various conditions and on the structure of the apparatus adapted to the invention, and the invention is not limited to the embodiments described herein.

In the following, the embodiments of the present invention are explained using the drawings. The image processing apparatus of the present invention will be described below as an imaging apparatus which picks-up an image.

Figure 1:
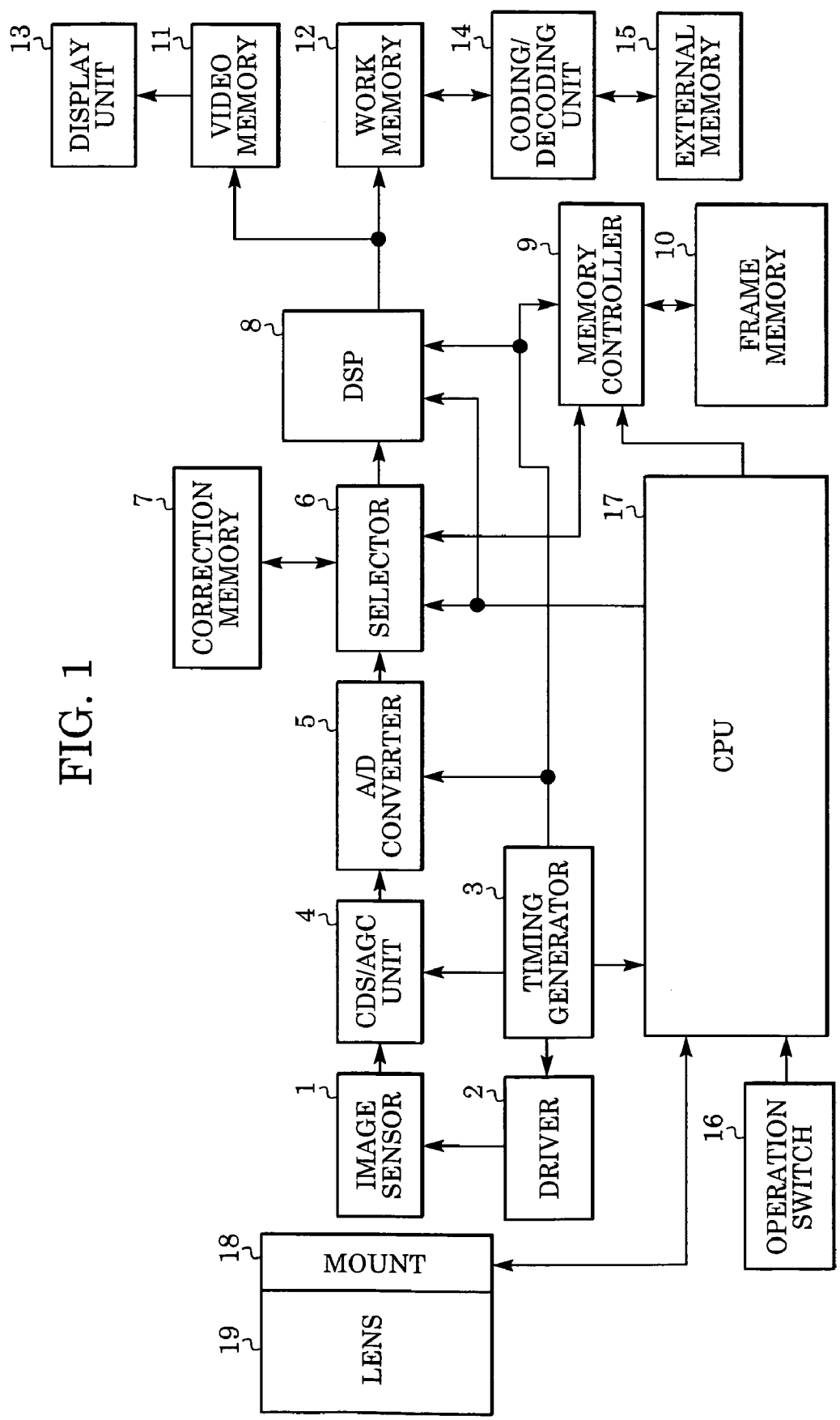
FIG. 1 is a block diagram of an imaging apparatus in one embodiment of the present invention.

FIG. 1 is a block diagram of an imaging apparatus in the present invention.

In FIG. 1, a lens 19 conducts image formation of a subject image, and is equipped with a lens mount 18 for mounting the lens 19 onto the imaging apparatus. An image sensor 1 (e.g., charge coupled device (CCD), complementary metal oxide semiconductor (CMOS), etc.) converts an optical image into an electric signal. A driver 2 drives the image sensor 1 on a predetermined frequency. Also, a timing generator 3 generates a vertical synchronizing signal (VD) and a horizontal synchronizing signal (HD) and provides timing signals to the driver 2, CDS (correlated double sampling)/AGC (automatic gain control) unit 4, and the CPU (central processing unit) 17.

An image signal generated by the image sensor 1 is input to the CDS/AGC unit 4. The CDS/AGC unit 4 removes a reset noise, etc., included in an output of the image sensor 1 and amplifies the output to a predetermined signal level. An A/D (analog/digital) converter 5 converts the amplified image signal to a digital image signal and outputs the digital image signal. The digital image signal is inputted to a memory controller 9 via a selector 6 and transmitted to a frame memory 10 via the memory controller 9. Therefore, in the imaging apparatus of the present embodiment, all the picked-up image signals are stored in the frame memory 10.

The image signal stored in the frame memory 10 is transmitted to a DSP (digital signal processor) 8 via the selector 6. The DSP 8 corrects the point defect of the image signal stored in the frame memory 10 based on correction data stored in a correction memory 7.

In the correction process of the point defect, the DSP 8 creates an interpolation pixel signal with reference to the circumference pixel of the point defect based on the correction data. Then, the image signal (defective pixel signal) of the point defect is interpolated by the interpolation pixel signal.

Additionally, the DSP 8 creates color signals of RGB from the corrected image signal. The color signals are stored in a work memory 12. Then a coding/decoding unit 14 compression-encodes the image data stored in the work memory 12 based on a predetermined compression method (e.g., JPEG (Joint Photographic Experts Group), JPEG2000 etc.). The encoded image data is stored in an external memory 15 (e.g., a non-volatile memory (a flash memory etc.)).

In cases where a shooting (namely, recording start of an image) is directed by an operation of an operation switch 16, a CPU (central processing unit) 17 controls the selector 6, and DSP 8 and memory controller 9, for the purpose of reading the image data of a frame from the frame memory 10 and storing the image data in the work memory 12 after performing an image processing by the DSP 8.

Additionally, in cases where the image data after shooting is reproduced, the image data stored in the external memory 15 is decoded by the coding/decoding unit 14, and the decoded image data is displayed on a display unit 13 after being stored in a video memory 11. Although the correction memory 7 for the point defect correction was specified with the arrangement of FIG. 1, the data for the point defect correction may be stored in a flash memory area of the DSP 8. The timing which obtains the correction data for the point defect correction may be at the time of a production process, or the correction data may be obtained beforehand and may be stored in the memory before shooting (e.g., at the time of a power supply starting, and every predetermined interval time).

Also, the operation switch 16 is used for a setup of a shooting condition, a calibration, and a selection of additional data.

It becomes possible to perform a correcting process of the point defect by using the correction data suitable for each user, by storing in the correction memory 7 the correction data obtained by setting conditions as described below and correcting the point defect based on the obtained correction data.

The example of various setting conditions according to this embodiment is described below:

(1) a storage time; 1 SEC., 30 SEC.

(2) an operating temperature; ROOM TEMPERATURE, 45° C.

(3) a usage environment; PRODUCTION PROCESS, USER (4) a usage type; IMAGE SENSOR, IMAGING APPARATUS (5) an operating condition; NORMAL, NC The storage time indicates a time for accumulating the charge of the image sensor when obtaining the correction data. That is, the storing time means an exposure time. The 1 SEC. indicates one second, and the 30 SEC. indicates thirty seconds. Also, the 30 SEC. indicates the longest accumulation (exposure) time of the imaging apparatus. That is, the 30 SEC. indicates the longest setup time in a shutter time priority shooting mode. The values of 1 SEC. and 30 SEC. are just examples, and any time value that would enable practice of the present invention is applicable.

The operating temperature indicates an environmental temperature when operating the image sensor to obtain the correction data. In this embodiment, the ROOM TEMPERATURE and the 45° C. can be set up. The ROOM TEMPERATURE indicates a room temperature when operating the image sensor to obtain the correction data. The 45° C. indicates a temperature higher than the room temperature. The above-described temperatures are just examples, and any temperature that would enable practice of the present invention is applicable.

The usage environment indicates an environment when operating the image sensor to obtain the correction data. The PRODUCTION PROCESS indicates an environment in a production process of the apparatus, and the USER indicates a user's usage environment where a user actually uses the image sensor.

The usage type indicates whether the image sensor is built into the imaging apparatus (i.e., a digital camera, video camera etc.), when obtaining the correction data. The IMAGE SENSOR indicates a state where the image sensor is not built into the imaging apparatus. That is, in the production process, the correction data is obtained when the image sensor is in the condition of a simple substance. The IMAGING APPARATUS indicate a state where the image sensor is built into the imaging apparatus. That is, the correction data is obtained in the state where the image sensor is built into the imaging apparatus.

The operating condition indicates a condition whether to operate the noise cancel when obtaining the correction data. The NORMAL indicates a condition where the noise cancel is not operated. The NC indicates a condition where the noise cancel is operated. The noise cancel processing is described below.

Figure 2A:
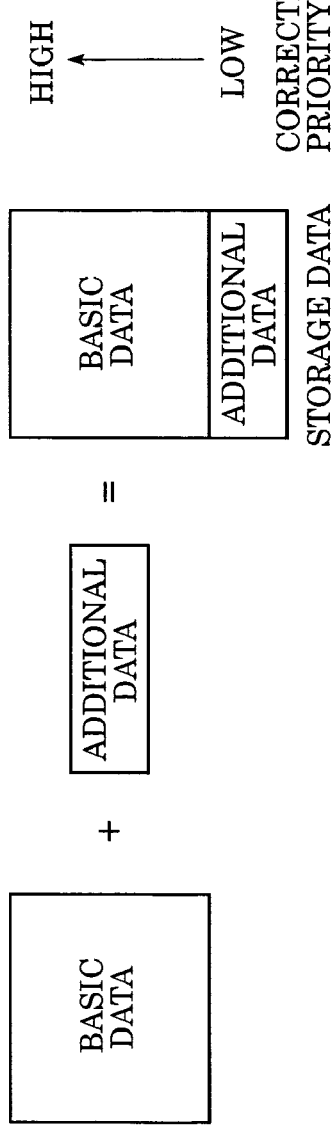
FIGS. 2A, 2B and 2C illustrate a creation method of a correction data in the present invention.
Figure 2B:
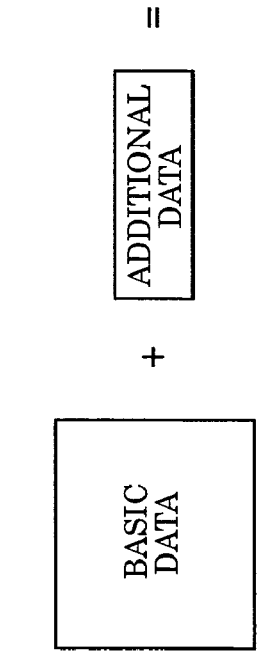
Figure 2C:
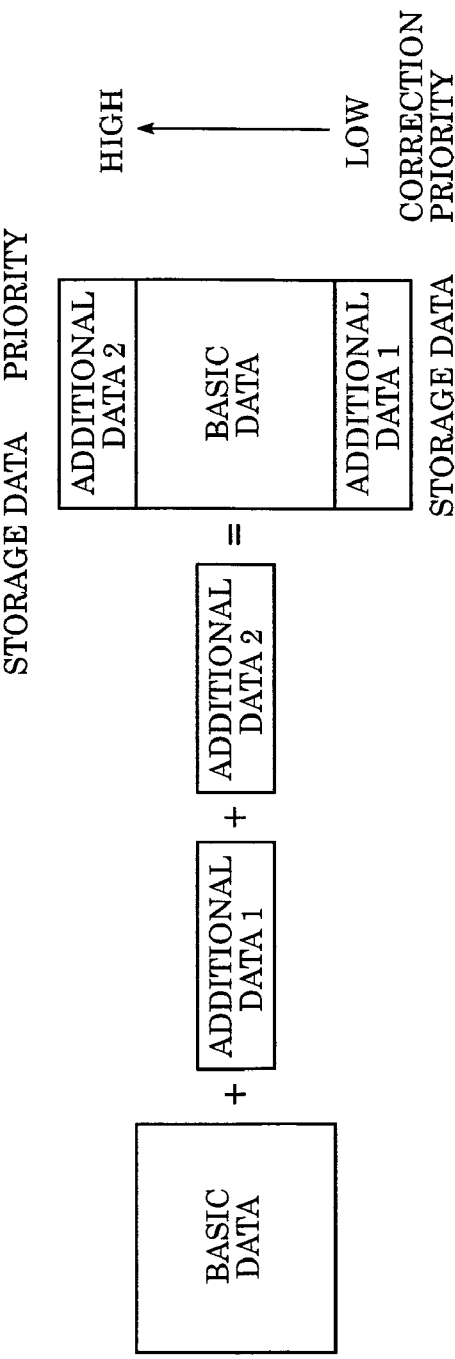

FIGS. 2A, 2B and 2C illustrate a storage method of a correction data in the present invention.

In this embodiment, a standard condition and an additional condition are set up by combining the above-described setting conditions (1) to (5). In this embodiment, the correction data obtained based on the standard condition is described to be basic data. Also, the correction data obtained based on the additional condition is described to be additional data. Only the data which does not exist in the basic data is added to the additional data. The basic data and additional data are provided a correction priority with respect to use thereof. In the storage data illustrated in FIG. 2, the correction priority of the data is high to low from the top of the storage to the bottom of the storage as shown in FIGS. 2A, 2B and 2C.

The basic data is always used for correction. Also, it is determined whether to use the additional data for correction in accordance with a shooting condition and/or a correcting process time. Therefore, the additional data is fundamentally set up in the priority of correction lower than the basic data.

However, in cases where the additional data is considered to be omission in extraction of the correction data in the production process or the additional data is obtained by a calibration operation, the priority of the additional data can be set up higher than the basic data in order to always use the additional data.

In FIG. 2A, the creation method of the correction data in the case of using the additional data auxiliary for the basis data is illustrated. The additional data illustrates the data for correcting the point defect generated in a specific shooting condition. Therefore, the priority of the additional data is set lower than the basic data. Also, it is determined whether use the additional data for correction in accordance with a shooting condition and/or a correcting process time.

In FIG. 2B, the creation method of the correction data in the case of using the additional data preferentially for the basic data is illustrated. The additional data is the data obtained based on the additional condition set up in order to correct the point defect which has leaked on standard conditions, or the point defect generated later. For example, since the additional data obtained in a user's usage environment contains the correction data of the point defect generated at the time of actual shooting, the priority is set higher rather than the basic data. Also, the additional data is set up in accordance with a designation set by a user.

In FIG. 2C, the creation method of the correction data in the case of having additional data 1 used auxiliary for the basic data and additional data 2 used preferentially is illustrated.

It is determined whether the additional data 1 is used for correction in accordance with a shooting condition and/or a correcting process time. Also, the additional data 2 is set up in accordance with a designation set by a user and is always used with the basic data.

The point defect generated by user's usage environment and a specific shooting condition is efficiently correctable with the correction data created as described above.

FIGS. 3A, 3B, 3C, and 3D illustrate an acquiring condition of a correction data in the present invention. FIGS. 3A, 3B, 3C, and 3D, provide four examples of combination of the above-described conditions (1) to (5), which are adapted in FIG. 2C. Typically, the design engineer of the imaging apparatus will choose desired conditions from among the four kinds of examples and include them in the imaging apparatus.

In FIGS. 3A, 3B, 3C and 3D, an additional condition 2 indicates a condition in order that a user may create an original correction data. Therefore, user's use environment (described as the USER) is described in the item of the usage environment (3), and IMAGE APPARATUS is described in the item of the usage type (4). The items of the storage time (1), operating temperature (2), and operating condition (5) are described as ARBITRARY, because they become the shooting condition which the user set up.

The NORMAL of the operating condition (5) indicates the condition of OFF of the noise cancel operation, and the NC indicates the condition of ON of the noise cancel operation. The noise cancel operation is an operation which prevents the image quality deterioration generated by the abnormality of dark current characteristics, by deducting the dark picture, which is obtained by the same storage time as the exposure time of a picked-up image, from the picked-up image.

In FIG. 3A, the difference between the standard condition and the additional condition 1 is the storage time (1). According to the additional condition 1 of the (3A), the additional data 1 corresponding to long-time exposure can be obtained. Additionally, since the difference between the standard condition and additional condition 1 is only the storage time (1), the additional data can be obtained easily.

In FIG. 3B, the difference between the standard condition and the additional condition 1 is the storage time (1) and operating temperature (2). According to the additional condition 1 of the FIG. 3B, the additional data 1 used in the environment of high temperature (45° C.) can be obtained.

In FIG. 3C, unlike the FIGS. 3A and 3B, the standard conditions of FIG. 3C have set operating temperature as 45° C. In the additional condition 1 of FIG. 3C, the IMAGING APPARATUS is used on the usage type (4) and the NC is used on the operating condition (5). The basic data corresponding to broad temperature conditions can be obtained by raising temperature on the standard condition. In the imaging apparatus which is an actual usage type, the additional data 1 corresponding to the noise cancel operation can be obtained according to the additional condition 1. According to the standard condition and additional condition 1, the correction data (the basic data and the additional data 1) corresponding to a broad shooting condition can be obtained.

In FIG. 3D, the Standard condition is the same as the standard conditions of FIG. 3C. The additional condition 1 is changed into the long time (30 sec.) in the storage time (1) of the standard condition. According to the standard condition and additional condition 1, the correction data according to the storage time of 1 sec. and 30 sec. can be obtained in the environment of high temperature (45° C.).

A production process of the imaging apparatus or the image sensor may be sufficient as the production process. In cases where an acquisition of the correction data is the production process of the image sensor, the correction data should be stored in a storage medium etc., and be installed in the production process of the imaging apparatus.

Figure 4:
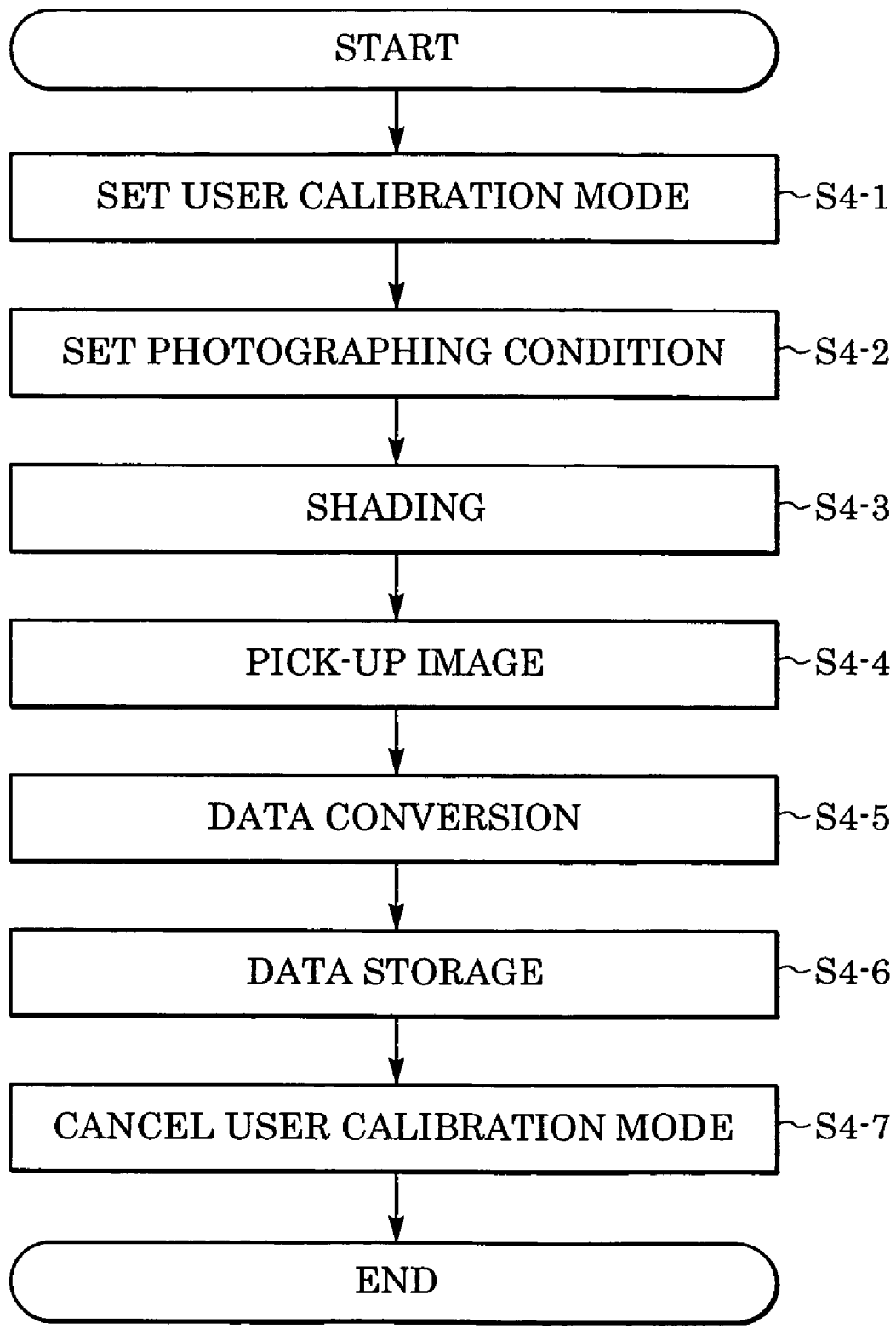
FIG. 4 is a flowchart illustrating a calibration operation in the present invention.

FIG. 4 is a flowchart illustrating a calibration operation in the present invention. The calibration operation extracts the information of the point defect (the defective pixel signal) generated in a usage environment and a shooting condition where a user uses the imaging apparatus and adds the correction data according to the extracted information. The usage environment is for example, the ground in a tropical rain forest or the ground of in ice field.

In cases where the user performs the calibration, the user sets up the user calibration mode (UC) by operating the operation switch 16 (step S4-1). Next, the shooting conditions, such as the storage time and the noise cancel operation, are set (step S4-2).

Next, the imaging apparatus is shaded (step S4-3). In cases where the lens is mounted on the imaging apparatus, the shading is performed by mounting a lens cap, and in cases where not mounted, the shading is performed by mounting a mount cap. The shading of reversely incident light from a finder is performed by mounting an eyepiece shutter or a shielding member.

After shading, a release button is pushed and a dark image is picked-up (step S4-4). At the time of the calibration operation, a RAW image which is converted into the digital signal the pixel signal outputted from an image sensor is recorded regardless of a recording mode setup for shooting.

Next, the position of the pixel determined to be the point defect, the level of the point defect, etc. are detected from the picked-up RAW image, and the correction data is created based on the detected position and level (step S4-5). The correction data is stored in the correction memory 7 and the RAW image used for the detection of the point defect is deleted (step S4-6). Finally, after notifying a user of the end of storage of the correction data, the user calibration mode is canceled (step S4-7). The processing is then completed.

The user can select whether the additional data obtained by the calibration mode is used as the correction data using the operation switch 16.

The criterion of the determination performed in step S4-5 may be set up beforehand by the user. FIG. 5 depicts a manual setting method of the density level extracted as a point defect by a user.

FIGS. 5A and 5B illustrates an extraction defect level setting screen.

FIG. 5A illustrates the setting screen for inputting the extraction defect level determined to be the point defect. More than the extraction defect level inputted in the setting screen of FIG. 5A is determined to be the point defect.

FIG. 5B illustrates the screen which shows the histogram of the dark image with the extraction defect level. The level of the dotted line in FIG. 5B illustrates the extraction defect level set up by the user. The user can recognize whether more than which level is detected as the point defect by the setting screen of FIG. 5B. Therefore, the user can set up the optimal extraction defect level, referring to the histogram of the actually picked-up image.

The dark image illustrated by the histogram is the RAW image. The setting range of the extraction defect level is 1 to 4095 because the RAW image is 12 bits data. Therefore, the extraction defect level can be set up within the limits of the density level which can be expressed with the bit number of the RAW image.

Additionally, the imaging apparatus can store the result of the calibration for every user in order to improve user-friendliness in cases where a plurality of users uses the imaging apparatus.

Figure 6A:
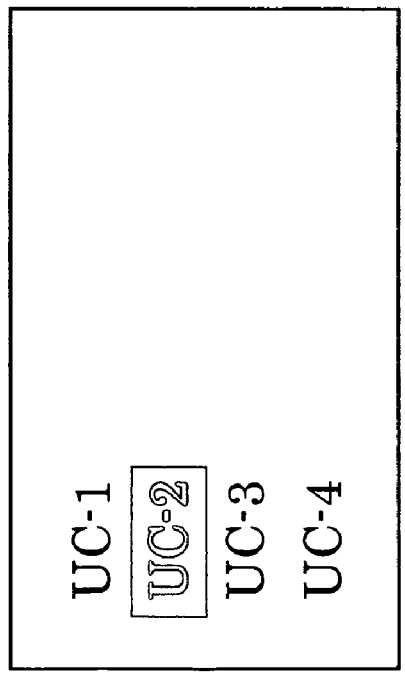
FIG. 6A illustrates a calibration setting screen.

FIG. 6A illustrates a calibration setting screen, in cases where there are four calibration settings (UC-1, UC-2, UC-3 and UC-4).

In FIG. 6A, the calibration setting of the UC-2 is selected by the operation switch 16.

Figure 6B:
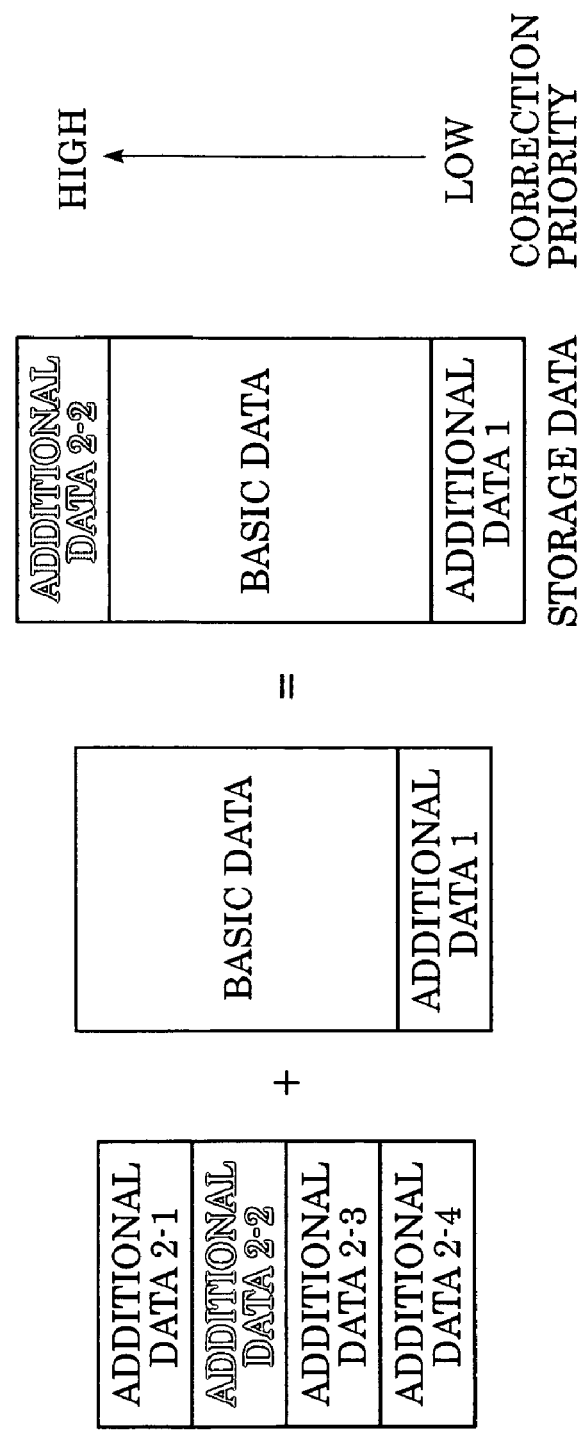
FIG. 6B illustrates a creation method of a correction data.

FIG. 6B illustrates a creation method of a correction data.

In FIG. 6B, the correction data is created based on additional data 2-2 corresponding to the selected UC-2, the basic data and the additional data 1. In FIG. 6B, additional data 2-1 corresponds to the UC-1, additional data 2-2 corresponds to the UC-2, additional data 2-3 corresponds to the UC-3, and additional data 2-4 corresponds to the UC-4.

The imaging apparatus assigns memory areas of the additional data 2 corresponding to the number of users which use the imaging apparatus and a plurality of calibration settings (for example, UC-1, UC-2, US-3 and US-4 of FIG. 6A). Additionally, when the user sets up the user calibration mode (UC), one of the calibration settings is selected by using the operation switch 16 and the memory area of the additional data 2 is exchanged according to the selected result.

Here, the correcting process of the point defect is explained in detail using the conditions of FIG. 3C, i.e., in cases where the temperature is always high in the user's usage environment.

First, in the production process, the dark image is picked-up on the conditions that the temperature of the image sensor simple substance is 45° C. and the storage time is 1 sec., and then the correction data of the point defect is created based on the dark image. The correction data is the basic data of the standard condition. The basic data can be adapted in cases where the image sensor is high temperature, but in cases where it takes a picture by setup of long-time exposure (30 sec.), the point defect which cannot be corrected may exist and image quality deterioration may occur.

Then, the additional data 1 is created on the conditions (the additional condition 1) that the storage time is 30 sec., the temperature of the image sensor is room temperature and the NC is performed. In cases where a long-time exposure (30 sec.) shooting is performed, the point defect is corrected using the additional data 1 with the basic data. Since the additional data 1 is used on special conditions, the priority of correction is set up low. Additionally, in cases where other than the special conditions, for example, a margin exists in the time of the correcting process or the high-quality mode is set up, the additional data 1 with the basic data may be used. That is, the DSP 8 determines whether the additional data 1 is used with the basic data in accordance with the shooting condition and the time of the correcting process.

Next, in cases where a user calibration is directed by the user using, the additional data 2 based on the additional condition 2 is created by performing processes of FIG. 4. Since the additional data 2 turns into data which corrects the point defect generated in the user's usage environment, the priority of correction of the additional data 2 is set high. Therefore, the point defect in the user's usage environment can be corrected. Also, it can be determined, according to a designation set by a user, whether the additional data 2 is used with the basic data 2. The designation is set by the user via operation switch 16.

Thus, by having the additional data 1 which sets up low priority, and the additional data 2 which sets up high priority, the point defect can be suitably corrected for each user's unique usage environment and shooting condition.

As explained above, by generating the correction data actually used for a shooting image based on the correction data obtained in the production process and in user's usage environment, suitable correction processing can be performed resulting in high image quality. Since the point defect is detected by the shooting condition according to the user, and correction data is created based on the detection result, the suitable correction processing according to the user can be realized.

Figure 7:
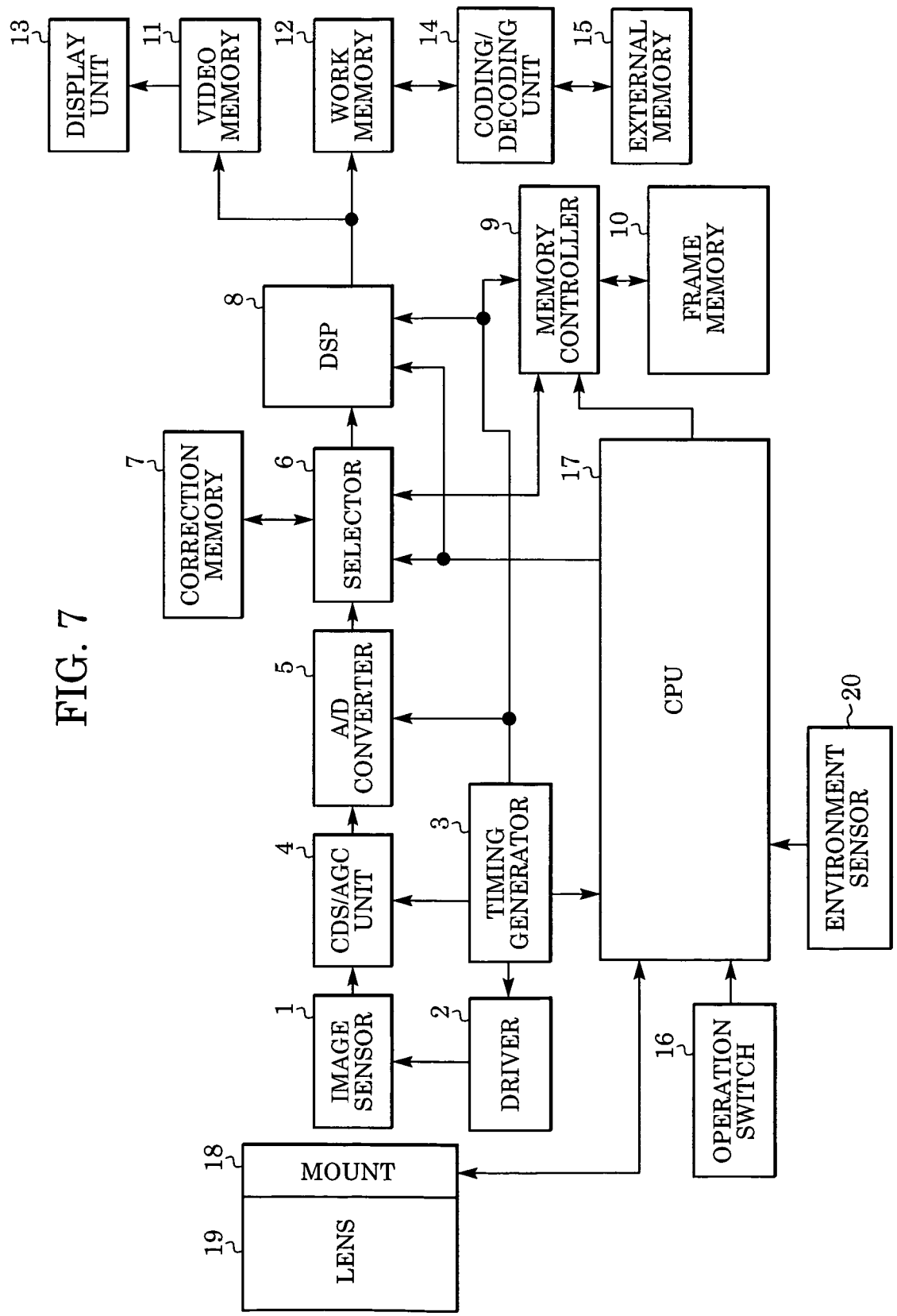
FIG. 7 is a block diagram of an imaging apparatus in another embodiment of the present invention.

An additional embodiment where the selection process of whether additional data uses may be performed is described as follows. As shown in FIG. 7, the imaging apparatus of the present embodiment is similar to the imaging apparatus of the above-described embodiment, with the addition of an environment sensor 20. The environment sensor 20 detects a temperature of the image sensor 1, as well as the humidity, and atmospheric pressure of the shooting environment.

The shooting information with respect to shooting conditions (e.g., exposure time, noise cancel etc.) and environment (e.g., temperature, humidity, atmospheric pressure) when obtaining the additional data is stored in the correction memory 7 correlated with the additional data. The CPU 17 determines whether the additional data is used for the picked-up image data by comparing the stored shooting information and current shooting information of the shooting mode and environment sensor when obtaining the picked-up image data. For example, the additional data is used for the correction if the current shooting information is substantially identical to the stored information. Additionally, if a margin is in the processing time, the additional data is used for the correction. Although the temperature, humidity, and atmospheric pressure are detected in this embodiment, detection of all three is not necessary for implementation of the present embodiment, and detection of any combination that would allow practice of the present invention is applicable.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims the benefit of Japanese Patent Laid-Open No. 2004-183668, filed Jun. 22, 2004, which is hereby incorporated by reference herein.

What is claimed is:

1. An image processing apparatus comprising:
   a memory configured to store first correction data created based on defective pixel signals output from an image sensor set to a first condition, second correction data created based on defective pixel signals output from the image sensor set to a second condition which is different from the first condition, and third correction data created based on defective pixel signals output from the image sensor set to a third condition which is different from the first condition and the second condition; and
   a correcting unit configured to correct defective pixel signals output from the image sensor using the first correction data, the second correction, and the third correction data,
   wherein the correcting unit uses the third correction data in priority to the first correction data to correct the defective pixel signals, and uses the first correction data in priority to the second correction data to correct the defective pixel signals.

2. An image processing method comprising steps of:
   storing, on a memory, first correction data created based on defective pixel signals output from an image sensor set to a first condition, second correction data based on defective pixel signals output from the image sensor set to a second condition which is different from the first condition, and third correction data created based on defective pixel signals output from the image sensor set to a third condition which is different from the first condition and the second condition; and
   correcting defective pixel signals output from the image sensor using the first correction data, the second correction data, and the third correction data,
   wherein, in the correcting step, the third correction data is used in priority to the first correction data to correct the defective pixel signals, and the first correction data is used in priority to the second correction data to correct the defective pixel signals.

* * * * *